(12) United States Patent
Page

(10) Patent No.: US 9,121,709 B2
(45) Date of Patent: Sep. 1, 2015

(54) METHOD OF FORMING A GRID DEFINING A FIRST RELATIVE REFERENCE FRAME

(71) Applicant: GE Aviation Systems LLC, Grand Rapids, MI (US)

(72) Inventor: Jerry Lynne Page, Alto, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 423 days.

(21) Appl. No.: 13/795,002

(22) Filed: Mar. 12, 2013

(65) Prior Publication Data

US 2014/0259706 A1   Sep. 18, 2014

(51) Int. Cl.
| | |
|---|---|
| *G01C 21/00* | (2006.01) |
| *G02F 1/01* | (2006.01) |
| *B60K 31/00* | (2006.01) |
| *G01S 17/93* | (2006.01) |
| *G08G 1/16* | (2006.01) |

(52) U.S. Cl.
CPC ............ *G01C 21/00* (2013.01); *B60K 31/0008* (2013.01); *G01S 17/936* (2013.01); *G02F 1/01* (2013.01); *G08G 1/16* (2013.01)

(58) Field of Classification Search
CPC .................................. G01C 21/00; G02F 1/01
USPC ....................................... 33/228; 359/238, 35
See application file for complete search history.

(56) References Cited

U.S. PATENT DOCUMENTS

| | | | | |
|---|---|---|---|---|
| 4,823,476 | A * | 4/1989 | Curtin .............................. | 33/512 |
| 6,994,437 | B2 * | 2/2006 | Suzuki et al. ................... | 353/77 |
| 7,130,092 | B1 * | 10/2006 | Horimai .......................... | 359/35 |
| 7,345,743 | B1 | 3/2008 | Hartman et al. | |
| 7,681,839 | B2 | 3/2010 | Mickley et al. | |
| 7,979,993 | B2 * | 7/2011 | Tippett et al. .................... | 33/228 |
| 8,326,523 | B2 * | 12/2012 | Stimac et al. ................. | 701/300 |
| 8,352,100 | B2 * | 1/2013 | Stimac et al. ..................... | 701/4 |
| 8,386,096 | B2 * | 2/2013 | Stimac et al. ..................... | 701/4 |
| 8,463,463 | B1 * | 6/2013 | Feldmann et al. ................. | 701/3 |
| 2002/0079425 | A1 * | 6/2002 | Rhoads ....................... | 250/201.9 |
| 2006/0028706 | A1 * | 2/2006 | Totzeck et al. ................ | 359/238 |
| 2009/0307913 | A1 * | 12/2009 | Schulze .......................... | 33/1 G |
| 2013/0321744 | A1 * | 12/2013 | Lin et al. ......................... | 349/84 |
| 2014/0268269 | A1 * | 9/2014 | Lopez et al. ............... | 359/200.7 |

FOREIGN PATENT DOCUMENTS

| | | |
|---|---|---|
| EP | 0219767 A2 | 4/1987 |
| EP | 2339296 A2 | 6/2011 |
| EP | 2589930 A2 | 5/2013 |

OTHER PUBLICATIONS

GB Search Report and Written Opinion issued in connection with corresponding GB Application No. GB1404233.7 on Sep. 12, 2014.

\* cited by examiner

*Primary Examiner* — Christopher Fulton

(74) *Attorney, Agent, or Firm* — General Electric Company; William S. Munnerlyn

(57) ABSTRACT

A method of projecting into space, from a first object, a plurality of modulated lines to form a grid defining a first relative reference frame, the method includes simultaneously projecting into space from the first object a horizontal grid line and a vertical grid line to form a set of grid lines, modulating the horizontal grid line and the vertical grid line to carry first and second grid words, respectively.

19 Claims, 5 Drawing Sheets

METHOD OF FORMING A GRID DEFINING A FIRST RELATIVE REFERENCE FRAME

BACKGROUND OF THE INVENTION

Relative navigation systems are useful for various applications such as autonomous vehicle navigation such as in a warehouse or factory environment, mid-air refueling, and space docking. In some applications, only the range between two objects is required. In other applications, both the range and the relative attitude (pitch, yaw, and roll) between two objects are required. In such applications high reliability and low cost are desirable.

BRIEF DESCRIPTION OF THE INVENTION

In one embodiment, the invention relates to a method of projecting into space, from a grid generator 10, a plurality of modulated lines to form a grid defining a first relative reference frame, the method includes simultaneously projecting into space from the grid generator 10 a horizontal grid line and a vertical grid line to form a set of grid lines, modulating the horizontal grid line and the vertical grid line to carry first and second grid words, respectively and wherein the horizontal grid line and the vertical grid line are uniquely identifiable to aid in detection, by a second object, of each of the horizontal grid line and the vertical grid line.

DESCRIPTION OF EMBODIMENTS OF THE INVENTION

Figure 1:
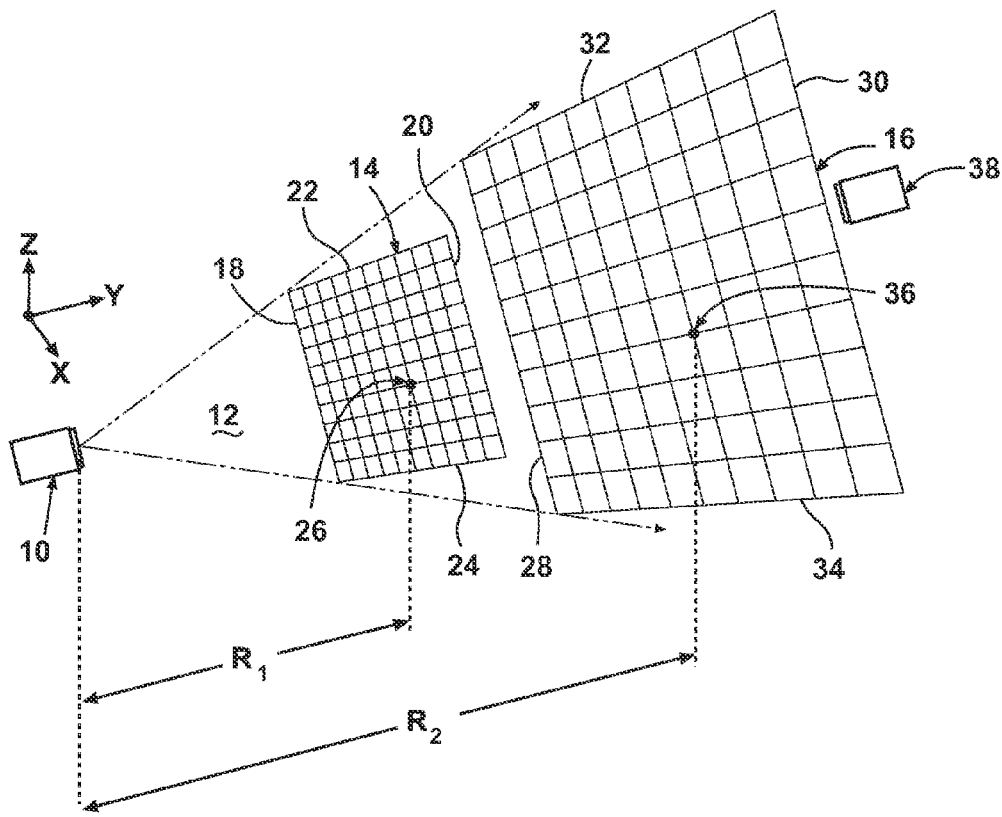
FIG. 1 is an exemplary view of a grid projected into space from a grid generator capable of projecting a grid according to embodiments of the invention.

FIG. 1 illustrates a grid generator 10, which projects a grid, such as a plurality of intersecting lines, into space within a field of transmission 12. As illustrated, the projected grid comprises intersecting lines. At some distance away from the grid generator 10, these intersecting lines are observed as a grid in space, with the size of the grid increasing away from the grid generator 10.

For description purposes, the grid generator 10 may be thought of as projecting intersecting lines substantially in the y direction of the illustrated coordinate system. If one were to observe the projection of intersecting lines in the x-z plane at some distance $R_1$ away from the grid generator 10, one would observe a first grid 14. If one were to observe the same projection of intersecting lines at a distance $R_2$, which is greater than the first distance $R_1$ in the x-z plane, one would observe a second grid 16, which appears relatively larger than the first grid 14.

The first grid 14 at distance $R_1$ away from the grid generator 10 is spatially bound in the horizontal direction by a first vertical line 18 and a second vertical line 20. There exists a plurality of vertical lines spatially and temporally generated in between the first vertical line 18 and the second vertical line 20. The first grid 14 at a distance $R_1$ away from the grid generator 10 is spatially bound in the vertical direction by a first horizontal line 22 and a second horizontal line 24. There exists a plurality of horizontal lines spatially and temporally between the first horizontal line 22 and the second horizontal line 24. The distance $R_1$ can be any distance between the first grid 14 and the grid generator 10. For convenience, the distance is determined between a point 26 on the first grid 14 and the grid generator 10 as shown.

The second grid 16 at distance $R_2$ away from the grid generator 10 is for all practical purposes the same as the first grid 14, but at a further distance from the grid generator 10 than the first grid 14. The second grid 16 is spatially bound in the horizontal direction by a first vertical line 28 of the second grid 16 and a second vertical line 30 of the second grid 16. There exists a plurality of vertical lines spatially and temporally generated in between the first vertical line 28 of the second grid 16 and the second vertical line 30 of the second grid 16. The second grid 16 at a distance $R_2$ away from the grid generator 10 is spatially bound in the vertical direction by a first horizontal line 32 of the second grid 16 and a second horizontal line 34 of the second grid 16. There exists a plurality of horizontal lines spatially and temporally between the first horizontal line 32 of the second grid 16 and the second horizontal line 34 of the second grid. A point 36 on the second grid 16 is shown.

The similarity of the grids 14 and 16 becomes apparent in the case of projected grid lines, where the second grid 16 is formed by the same lines forming the first grid 14, except the second grid 16 is observed at a further distance from the grid generator 10, making the second grid 16 appear larger than the first grid 14. In this sense, the second grid 16 is the appearance of the grid lines generated by the grid generator 10 at the distance $R_2$ whereas the first grid 14 is the appearance of the grid lines at the distance R1.

The grids 14 and 16 may be of any number of lines. As illustrated, they are comprised of ten vertical lines by ten horizontal lines. A grid comprised of a greater number of intersecting lines may result in improved detection angular resolution for a fixed field of transmission 12 and distance from the grid generator 10 than a grid comprised of a fewer number of intersecting lines. The grids 14 and 16 are depicted as a square shape, but this is not a requirement for the methods and apparatus of this invention. The grid can be any shape including rectangular, oval, or circular. Furthermore, the intersecting lines of the grids 14 and 16 are depicted as orthogonal; however, this is not a requirement for the methods and apparatus of the present invention. The angles between the intersecting lines may be right angles, acute angles, or obtuse angles in different parts of the grid.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

A detector module 38 may lie within the field of transmission 12 of the grid generator 10, enabling the detector module 38 to "see" the grid. The detector module 38 may be configured in any suitable manner to "see" the grid.

In current systems, the horizontal and vertical laser beam scans are interleaved. More specifically, first a horizontal laser line is scanned across a field of view and then a vertical line is scanned horizontally and the cycle repeats. As each of these lines scan across space, the light is modulated with a unique code synchronized with the position of the light during each of the vertical and horizontal scans. This describes a two dimensional grid of points, with each point uniquely represented by a horizontal and vertical component resulting from the sequential horizontal and vertical scans.

Figure 2:
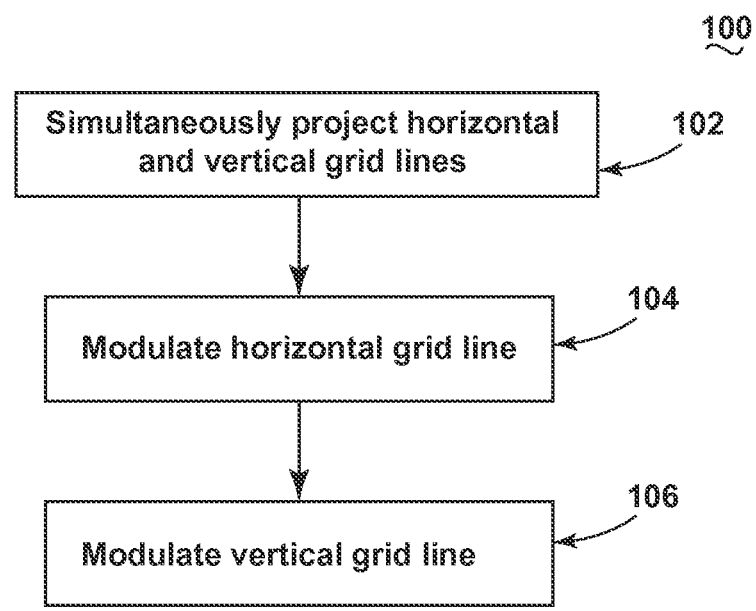
FIG. 2 is a flow chart showing a method of simultaneously projecting into space from a grid generator a horizontal grid line and a vertical grid line according to an embodiment of the invention.

Embodiments of the invention include projecting into space, from a grid generator, a plurality of modulated lines to form a grid defining a first relative reference frame. In accordance with an embodiment of the invention, FIG. 2 illustrates a method 100, which may be used for projecting a grid into space. It will be understood that the term "space" is not limited to outer space and that the grid may be projected into any suitable space including both indoors and outdoors. The method 100 begins at 102 with simultaneously projecting into space from a grid generator a horizontal grid line and a vertical grid line to form a set of grid lines. The horizontal grid line and the vertical grid line are uniquely identifiable to aid in detection, by a second object, of each of the horizontal grid line and the vertical grid line. This may be done in any suitable manner including by way of non-limiting examples that the wavelength or polarization of the lines may make them uniquely identifiable. The horizontal grid line and the vertical grid line may overlap to form a portion of the grid.

The horizontal grid line may be modulated to carry a first grid word comprised of a number of modulated bits to identify the horizontal grid line within the grid by the modulated grid word at 104 and modulating the vertical grid line to carry a second grid word comprised of a number of modulated bits to identify the horizontal grid line within the grid by the modulated grid word at 106. The horizontal and vertical grid words may be identical in time if they are modulated from the same source. Because each grid line is sweeping in different directions in space, a detector will in general see two different words except on the diagonal line of the grid in which they are identical e.g. (0,0) at the origin.

For example, by grid word, it is meant that the structure or characteristic of the grid provides data or information that may be read or detected by the detector module. Additionally, the grid word could be comprised of any number of bits, including any number of start or stop bits, data bits, or error checking, correction or parity bits. The data bits may encode the vertical and horizontal lines with a unique sequence of bits. Upon detection of these bits by the detector module and processing by the processor, microcontroller, or other circuitry, the location within the grid can be determined. Any number of known modulation methods could be used for encoding the grid words on to the horizontal grid line and the vertical grid line, including but not limited to, amplitude modulation (AM), frequency modulation (FM), quadrature amplitude modulation (QAM), or combinations thereof. One manner of encoding of the grid word is by modulating the beam being used to form the lines. Modulation may be achieved by changing the intensity of the beam and/or blocking the beam with some periodicity.

It will be understood that the method of forming a grid is flexible and that the method 100 illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from the embodiments of the invention. For example, the method 100 may include simultaneously projecting in sequence additional sets of horizontal and vertical grid lines to form additional portions of the grid. The additional sets of horizontal and vertical grid lines may be physically spaced from each other in space. Such additional lines may also be modulated. Each of the intersecting projected lines could be encoded differently or a grouping of intersecting lines could be encoded similarly.

Figure 3:
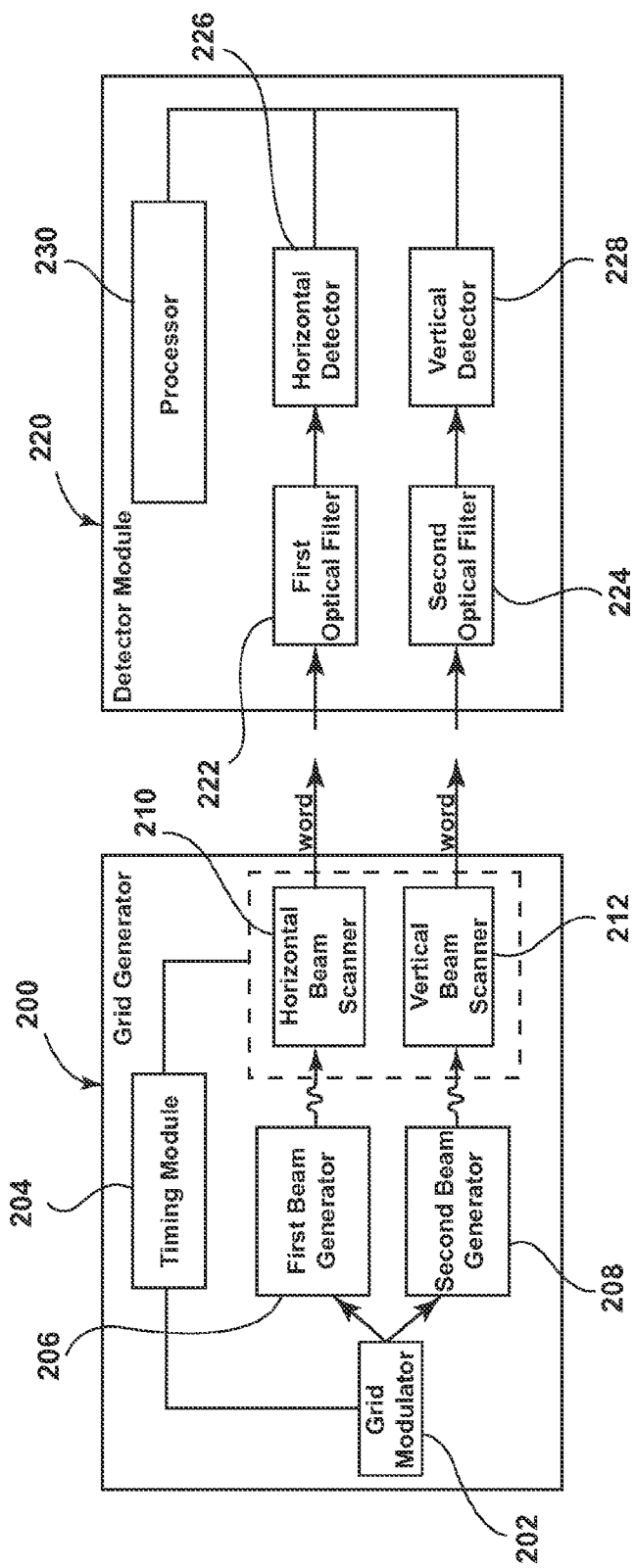
FIG. 3 is a schematic view of a grid generator that is capable of simultaneously projecting a horizontal grid line and a vertical grid line that are uniquely identifiable according to an embodiment of the invention.

FIG. 3 illustrates a grid generator 200 capable of operating according to an embodiment of the method 100. A grid modulator 202, a timing module 204, a first beam generator 206, a second beam generator 208, a horizontal beam scanner 210, and a vertical beam scanner 212 may be included in the grid generator 200. The first beam generator 206 and the second beam generator 208 may each include any suitable illumination source and beam shaper including that the illumination source may include a laser. In the illustrated example, the horizontal grid line and the vertical grid line are uniquely identifiable based on wavelength. More specifically, the horizontal grid line is projected by the first beam generator 206 at a first wavelength and the vertical grid line is projected by the second beam generator 208 at a second wavelength.

The second object or detector module 220 includes a first optical filter 222, which passes the first wavelength and a second optical filter 224, which passes the second wavelength. In the illustrated example, a horizontal detector 226 is operably coupled to the first optical filter 222 and a vertical detector 228 is operably coupled to the second optical filter 224. A processor 230 may also be included in the detector module 220 and may be operably coupled with the horizontal detector 226 and the vertical detector 228. The processor 230 may be any suitable processor capable of demodulation and processing the signals received from the horizontal detector 226 and the vertical detector 228 such that it may determine a location within the grid output by the grid generator 200.

During operation, the grid generator 200 may simultaneously output a horizontal grid line at a first wavelength and a vertical grid line at a second wavelength. More specifically, the grid modulator 202 may be capable of modulating the beam emitted from both the first beam generator 206 and the second beam generator 208. The timing module 204 may control the timing of the grid modulator 202, the horizontal beam scanner 210, and the vertical beam scanner 212. The beam having the first wavelength may be emitted from the first beam generator 206 and may be scanned to form a line by the horizontal beam scanner 210. Similarly, the beam having the second wavelength may be emitted from the second beam generator 208 and may be scanned to form a line by the vertical beam scanner 212.

Because each scanned horizontal grid line and vertical grid line is a different wavelength, each can be separated from the other by the detector module 220. More specifically, the horizontal detector 226 and the vertical detector 228 may each use the corresponding wavelength filters 222 and 224 to block the wavelength corresponding to one beam but not the other. This allows both beams emitted from the grid generator 200 to scan simultaneously without interference as long as each beam is detected by a detector module 220 with corresponding wavelength filters 222 and 224.

Figure 4:
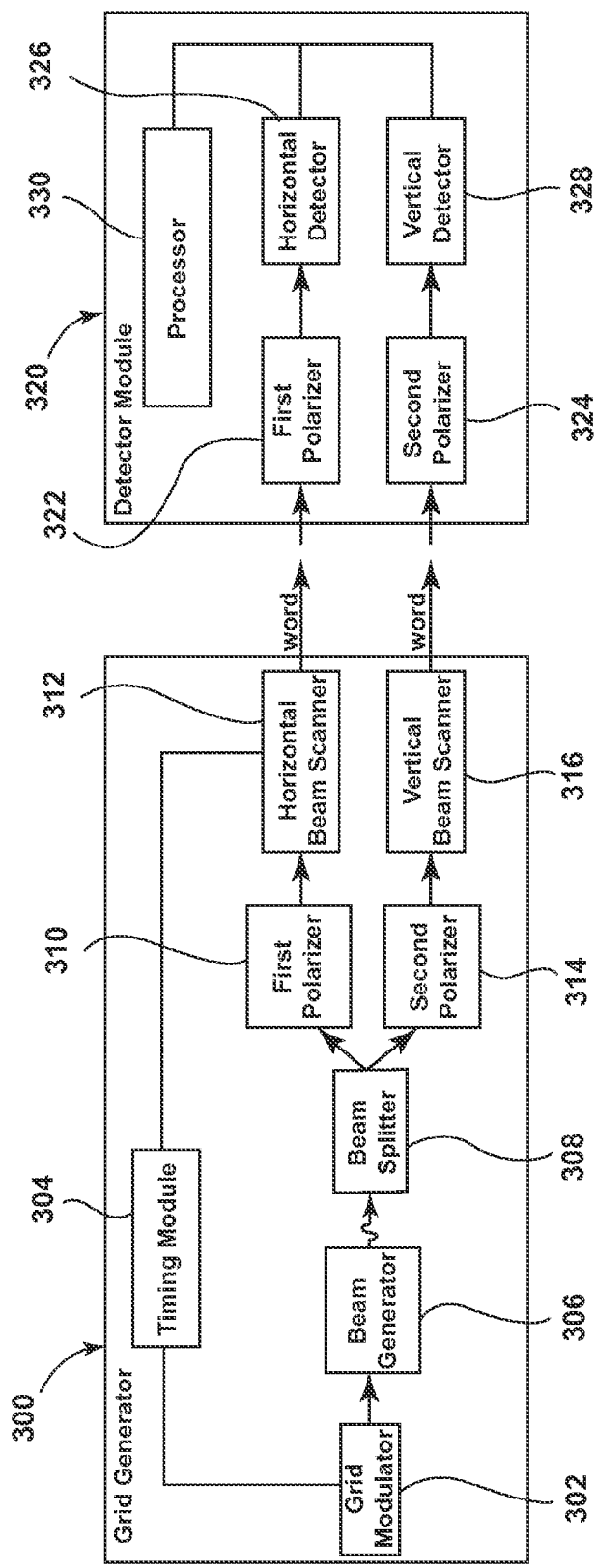
FIG. 4 is a schematic view of a grid generator that is capable of simultaneously projecting a horizontal grid line and a vertical grid line that are uniquely identifiable according to another embodiment of the invention.

FIG. 4 illustrates a grid generator 300 capable of operating according to an embodiment of the method of 100. A grid modulator 302, a timing module 304, a beam generator 306, a beam splitter 308, a first polarizer 310, a horizontal beam scanner 312, a second polarizer 314, and a vertical beam scanner 316 may be included in the grid generator 300. The grid modulator 302 may be operably coupled to the beam generator 306 to modulate the beam emitted therefrom. The beam generator 306 may include any suitable illumination source and beam shaper including that the illumination source may include a laser.

The gird generator 300 is capable of projecting a horizontal grid line and vertical grid line that are uniquely identifiable based on polarization. More specifically, the horizontal grid line and the vertical grid line may be projected with a polarized electric field having a first orientation and the other of the horizontal grid line and the vertical grid line is projected with a polarized electric field having a second orientation, which is different than the first orientation. The first polarizer 310 and the second polarizer 314 may be any suitable polarizer including a linear polarizer or a circular polarizer. Such polarization states of light may be used to provide the separation needed in order for the horizontal grid line and the vertical grid line to be simultaneously projected without interfering with each other.

As the term polarization is used in this description, it is meant to refer to the polarization state of light as defined by the orientation of its electric field as the light wave propagates. Light polarization states may vary by any desired degree of variation in the two orientations. However, for ease of use, two different orientations may be selected as orthogonal pairs such that one polarization may be blocked with an appropriately designed polarization filter or polarizer and still allow the corresponding orthogonal polarization to be transmitted.

One of the horizontal grid line and the vertical grid line may be projected with a polarized electric field having a first orientation and the other of the horizontal grid line and the vertical grid line is projected with a polarized electric field having a second orientation, which is different than the first orientation. For example, linearly polarized light can have its electric field polarized vertically or horizontally. Thus, the first orientation may be horizontal and the second orientation may be vertical. Since the two electric field vectors are perpendicular or orthogonal they cannot interfere with each other. By way of additional example, the polarized light can have its electric field circularly polarized, such that the light has an electric field vector that rotates about the axis of light propagation. The orthogonal polarization states have electric field vectors that rotate clockwise and counterclockwise and are called right hand circular polarization (RHCP) and left hand circular polarization (LHCP) respectively.

The second object or detector module 320 includes a first polarizer 322, which can pass one state of polarization and block the orthogonal polarization and a second polarizer 324, which passes the orthogonal polarization. In the illustrated example, a horizontal detector 326 is operably coupled to the first polarizer 322 and a vertical detector 328 is operably coupled to the second polarizer 324.

It will be understood that depending on the polarization used that the detector module 320 may include suitable polarizers to separate the detection of the horizontal grid line and the vertical grid line. For example, the detection by the detector module 320 may utilize a first linear polarizer-detector for horizontal polarization and a second linear polarizer-detector for vertical polarization. For linearly polarized light the polarizers 322 and 324 must be aligned with the electric field vector in order to pass one linear polarization and block all of the orthogonal polarization. Circular polarizations may be more useful since they are not sensitive to rotations about an optic axis. More specifically, when using linear polarization and polarizers proper orientation must be maintained to keep the polarizations separated. For example, if one object is transmitting horizontally polarized light, and a second object has two linear polarizer/detector combinations: one for the horizontal polarization and one for the vertically polarized light and if the second object were to roll about the optic axis, then the two polarizer/detectors would each see a component of the horizontally and vertically polarized transmitted beam and the required separation of the two beams would be lost. Thus, circular polarizations, rather than linear polarizations, may be more useful.

In the illustrated example, if the first polarizer 310 is a RHCP polarizer and the second polarizer 314 is a LHCP then the first polarizer 322 may be a RHCP and the second polarizer may be a LHCP. In this manner, corresponding right and left hand circular polarizers are utilized for the horizontal and vertical beam transmitter outputs and the corresponding detector inputs. This keeps the horizontal and vertical grid lines to be separated due to the orthogonal nature of the polarized beams and allows the simultaneous transmission of both beams. A processor 330 may also be included in the detector module 320 and may be operably coupled with the horizontal detector 326 and the vertical detector 328. The processor 330 may be any suitable processor capable of demodulation and processing the signals received from the horizontal detector 326 and the vertical detector 328 to determine the location within the grid output by the grid generator 300.

During operation, the illumination source or beam generator 306 may emit a single beam of light. The single beam of light may then be passed through the beam splitter 308, which may split the single beam of light into two beams of light. Each beam of light may then be polarized by the first polarizer 310 and second polarizer 314, respectively. If the first polarizer 310 is a right hand circular polarizer then the horizontal grid line may be projected with a right hand circular polarized electric field. Similarly if the second polarizer 314 is a left hand circular polarizer then the vertical grid line may be projected with a left hand circular polarized electric field. This allows the grid generator 300 to simultaneously output a horizontal grid line and a vertical grid line that are uniquely identifiable by the detector module 320. More specifically, the horizontal detector 326 and the vertical detector 328 may each use the corresponding circular polarizers 322 and 324 to block the field of transmission corresponding to one beam but not the other. This allows both beams to scan simultaneously without interference as long as each beam is detected by a detector with a corresponding polarizer.

Figure 5:
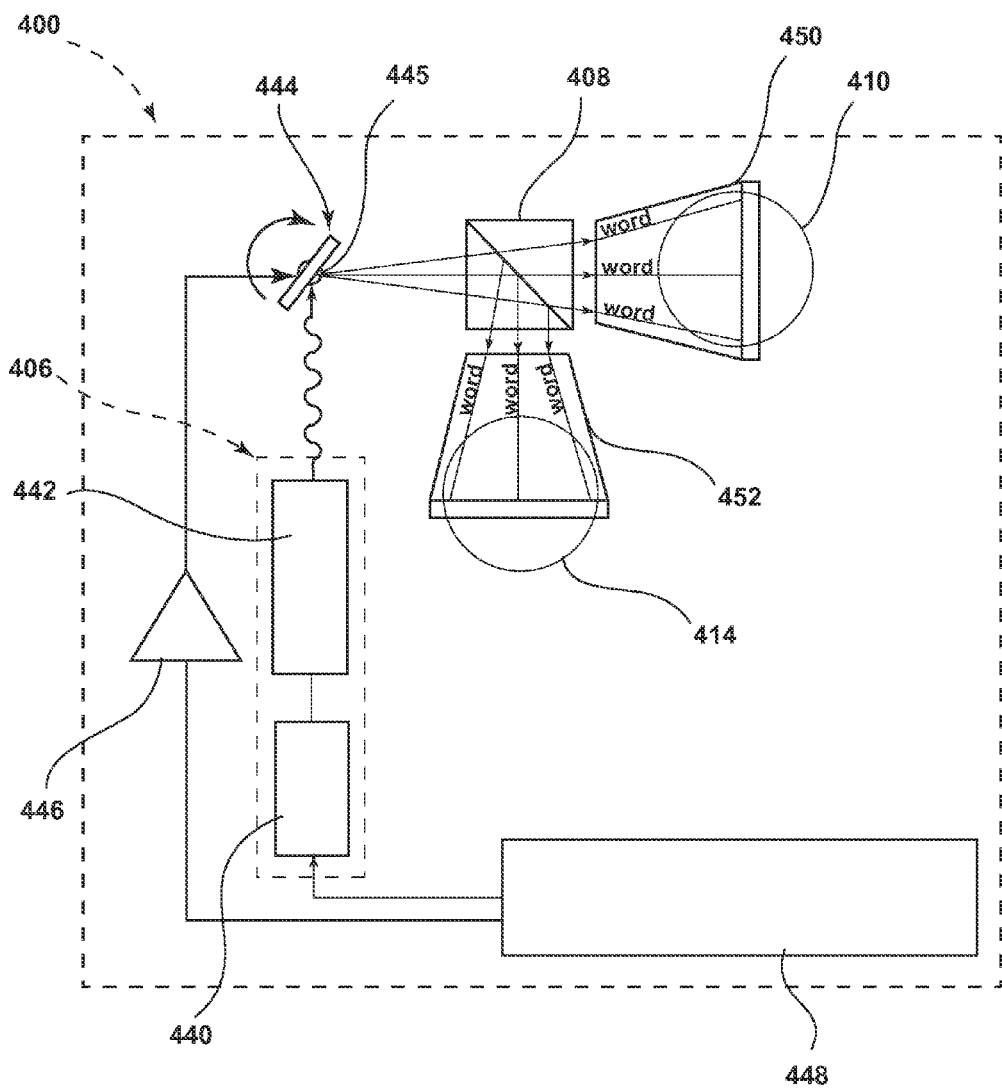
FIG. 5 is a schematic view of a grid generator that is capable of simultaneously projecting a horizontal grid line and a vertical grid line that are uniquely identifiable according to yet another embodiment of the invention.

FIG. 5 illustrates an alternative grid generator 400 capable of simultaneously projecting into space a horizontal grid line and a vertical grid line that are each uniquely identifiable based on polarization. The grid generator 400 includes many of the same features as the grid generator 300 previously described and therefore, like parts will be identified with like numerals increased by 100, with it being understood that the description of the like parts applies to this alternative embodiment, unless otherwise noted.

One difference is that the beam generator 406 is illustrated as including a laser 440 and a beam shaper 442. Further, a galvanometer 444 having a mirror 445 and a galvanometer drive 446 are illustrated. The galvanometer 444 may be utilized to scan the single beam of light from the beam generator 406 to form at least one of the horizontal and vertical grid lines. More specifically, the galvanometer 444 may scan the beam along portions of the beam splitter 408. The beam splitter 408 may be a polarizing cube beam splitter that creates a polarized horizontal grid line and a polarized vertical grid line from the single beam. A synchronizer 448 may be utilized to control the modulation, galvanometer scan rate, and electronic synchronization for the grid generator 400. Another difference is that a first mirror 450 and a second mirror 452 have been included. The first and second mirrors 450 and 452 may be utilized to project the polarized horizontal grid line and the polarized vertical grid line within the same plane and in a direction perpendicular to that plane.

In the illustrated example, the first polarizer 410 may be a right hand circular polarizer such that the vertical grid line may be projected with a right hand circular polarized electric field. Similarly the second polarizer 414 may be a left hand circular polarizer such that the horizontal grid line may be projected with a left hand circular polarized electric field. In this manner, the left hand circular polarizer 414 is used to transform the linearly polarized horizontal grid line and the right hand circular polarizer 410 is used to transform the linearly polarized vertical grid line into their respective circular polarization states.

During operation, the laser 440 creates a beam of light that is transmitted through the beam shaper 442 and is reflected from the mirror 445 that is being rotated by the galvanometer 444. The galvanometer 444 accomplishes the spatial beam scanning function. The galvanometer 444 by itself is capable of scanning in only one direction e.g. horizontal or vertical but not both.

The polarizing beam splitter 408 is in the path of the beam reflected from the rotating galvanometer 444. The polarizing beam splitter 408 transmits one state of linear polarization straight through the polarizing beam splitter 408 and reflects the orthogonal linear polarization state with a 90 degree deflection angle from the polarizing beam splitter 408 diagonal interface. The laser light incident on the polarizing beam splitter 408 is depolarized or the laser light is circularly polarized or the laser light is linearly polarized with a polarization azimuth of 45 degrees to the plane of incidence defined by the polarizing beam splitter 408 axes, so that fifty percent of the light will be transmitted through the polarizing beam splitter 408 and fifty percent will be reflected at the polarizing beam splitter 408 diagonal interface. The two beams are now separated in their angle of propagation by 90 degrees, the beam shapes are identical in orientation, and the galvanometer 444 scanning motions are in the same direction as they leave the polarizing beam splitter 408.

The first mirror 450 is placed in the path of the beam transmitted through the polarizing beam splitter 408, with an angle of incidence of 45 degrees, and with a plane of incidence perpendicular to the plane of incidence defined by the polarizing beam splitter 408. The first mirror 450 in the illustrated example may be oriented so that the scanning beam is transmitted out of the figure page, toward the viewer. The scanning motion will be vertical from the perspective of the viewer. The second mirror 452 is placed in the path of the beam reflected from the polarizing beam splitter 408 diagonal interface and oriented similar to the first mirror 450 except rotated 90 degrees clockwise. The second mirror 452 may be orientated such that the scanning beam is also reflected outward from the figure page. The beam has a scanning motion that is horizontal and the beam shape is also rotated 90 degrees from the vertical scanning beam. Thus, two parallel beams are created with each scanning in differing directions: vertical and horizontal, respectively. The corresponding beam shapes are also rotated 90 degrees from each other.

As with the earlier described embodiment, in order to separate the information in the two grid lines, each of the two beams is transformed into a circular and orthogonal polarization state. This is accomplished using the first and second circular polarizers 410 and 414. Each beam is already polarized due to the polarizing beam splitter 408 and the circular polarization can be created by using a simple $\lambda/4$ wave plate oriented at ±45 degrees. Signal processing may be done with a similar detector module to the detector module 320 described above.

The above described embodiments provided a variety of benefits including that the embodiments allow for the simultaneous transmission of two beams of light to form the horizontal and vertical grid lines. As the vertical and horizontal grid lines are uniquely identifiable, this allows both horizontal and vertical scans to happen in a coincident fashion versus the current sequential approach. This provides a factor of two increased data rate, compared to the current implementations, without increasing the frequency of the modulation waveform or detection bandwidth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of projecting into space, from a grid generator, a plurality of modulated lines to form a grid defining a first relative reference frame, the method comprising:
    simultaneously projecting into space from the grid generator a horizontal grid line and a vertical grid line to form a set of grid lines;
    modulating the horizontal grid line to carry a first grid word comprised of a number of modulated bits to identify the horizontal grid line within the grid by the modulated first grid word;
    modulating the vertical grid line to carry a second grid word, comprised of a number of modulated bits to identify the horizontal grid line within the grid by the modulated second grid word; and
    wherein the horizontal grid line and the vertical grid line are uniquely identifiable, based on at least one of wavelength or polarization, to aid in detection, by an object, of each of the horizontal grid line and the vertical grid line.

2. The method of claim 1 wherein the horizontal grid line and the vertical grid line overlap to form a portion of the grid.

3. The method of claim 2, further comprising simultaneously projecting in sequence additional sets of horizontal and vertical grid lines to form additional portions of the grid.

4. The method of claim 3 wherein the additional sets of horizontal and vertical grid lines are physically spaced from each other in space.

5. The method of claim 1 wherein the horizontal grid line is projected at a first wavelength and the vertical grid line is projected at a second wavelength.

6. The method of claim 5 wherein the horizontal grid line is projected at a first wavelength by a first beam generator and the vertical grid line is projected at a second wavelength by a second beam generator.

7. The method of claim 5 wherein the detection by the object utilizes a first optical filter passing the first wavelength and a second optical filter passing the second wavelength.

8. The method of claim 1 wherein one of the horizontal grid line and the vertical grid line is projected with a polarized electric field having a first orientation and the other of the horizontal grid line and the vertical grid line is projected with a polarized electric field having a second orientation, which is different than the first orientation.

9. The method of claim 8 wherein the first orientation is one of horizontal and vertical and the second orientation is the other of horizontal and vertical.

10. The method of claim 9 wherein the detection by the object utilizes a first linear polarizer-detector for horizontal polarization and a second linear polarizer-detector for vertical polarization.

11. The method of claim 1 wherein one of the horizontal grid line and the vertical grid line is projected with a right hand circular polarized electric field and the other of the horizontal grid line and the vertical grid line is projected with a left hand circular polarized electric field.

12. The method of claim 11 wherein the simultaneously projecting the horizontal grid line and the vertical grid line comprises projecting the horizontal and vertical grid lines with from an illumination source emitting a single beam of light.

13. The method of claim 12, further comprising passing the single beam of light through a beam shaper.

14. The method of claim 12 wherein the illumination source is a laser.

15. The method of claim 12, further comprising scanning the single beam of light utilizing a galvanometer to form at least one of the horizontal and vertical grid lines.

16. The method of claim 15, further comprising splitting the single beam utilizing a polarized beam splitter to create a polarized horizontal grid line and a polarized vertical grid line from the single beam.

17. The method of claim 16, further comprising utilizing mirrors to project the polarized horizontal grid line and the polarized vertical grid line within a same plane.

18. The method of claim 17 wherein a left hand circular polarizer is used to transform the linearly polarized horizontal grid line and a right hand circular polarizer is used to transform the linearly polarized vertical grid line into their respective circular polarization states.

19. The method of claim 18 wherein the detection by the object utilizes a first right hand circular polarizer-detector for right hand circular polarized light and a second left hand circular polarizer-detector for left hand circular polarized light.

* * * * *